United States Patent [19]
Lerich

[11] 3,744,367
[45] July 10, 1973

[54] EXPANSION BOLT
[76] Inventor: Lester Lerich, 30 Morningside Drive, Lakewood, Colo.
[22] Filed: May 6, 1970
[21] Appl. No.: 47,927

Related U.S. Application Data
[62] Division of Ser. No. 408,282, Nov. 2, 1964, abandoned.

[52] U.S. Cl. .................................. 85/79, 85/66
[51] Int. Cl. ........................................ F16b 13/04
[58] Field of Search .................. 85/79, 66, 63, 8.3; 285/105

[56] References Cited
UNITED STATES PATENTS
| | | | |
|---|---|---|---|
| 2,287,395 | 6/1942 | Reynolds | 85/66 |
| 2,774,273 | 12/1956 | Olson | 85/79 |
| 2,949,687 | 8/1960 | Peklay et al. | 85/8.3 |
| 3,216,306 | 11/1965 | Taylor | 85/79 |
| 3,304,828 | 2/1967 | Karhu | 85/66 |

FOREIGN PATENTS OR APPLICATIONS
| | | | |
|---|---|---|---|
| 860,124 | 2/1961 | Great Britain | 85/8.3 |
| 1,056,363 | 10/1953 | France | 85/79 |
| 1,305,740 | 8/1962 | France | 85/79 |

*Primary Examiner*—Marion Parsons, Jr.
*Attorney*—John E. Reilly

[57] ABSTRACT

An expansion bolt comprising a shank having threads at one end and at least one longitudinally extending external groove in the other end of the shank. The groove is provided with an inclined portion and a relatively deep portion with an expansion means disposed within the shank in said groove to yieldingly urge a wedge member, disposed in said groove, outwardly into wedging engagement with the wall of an opening.

10 Claims, 6 Drawing Figures

Patented July 10, 1973  3,744,367
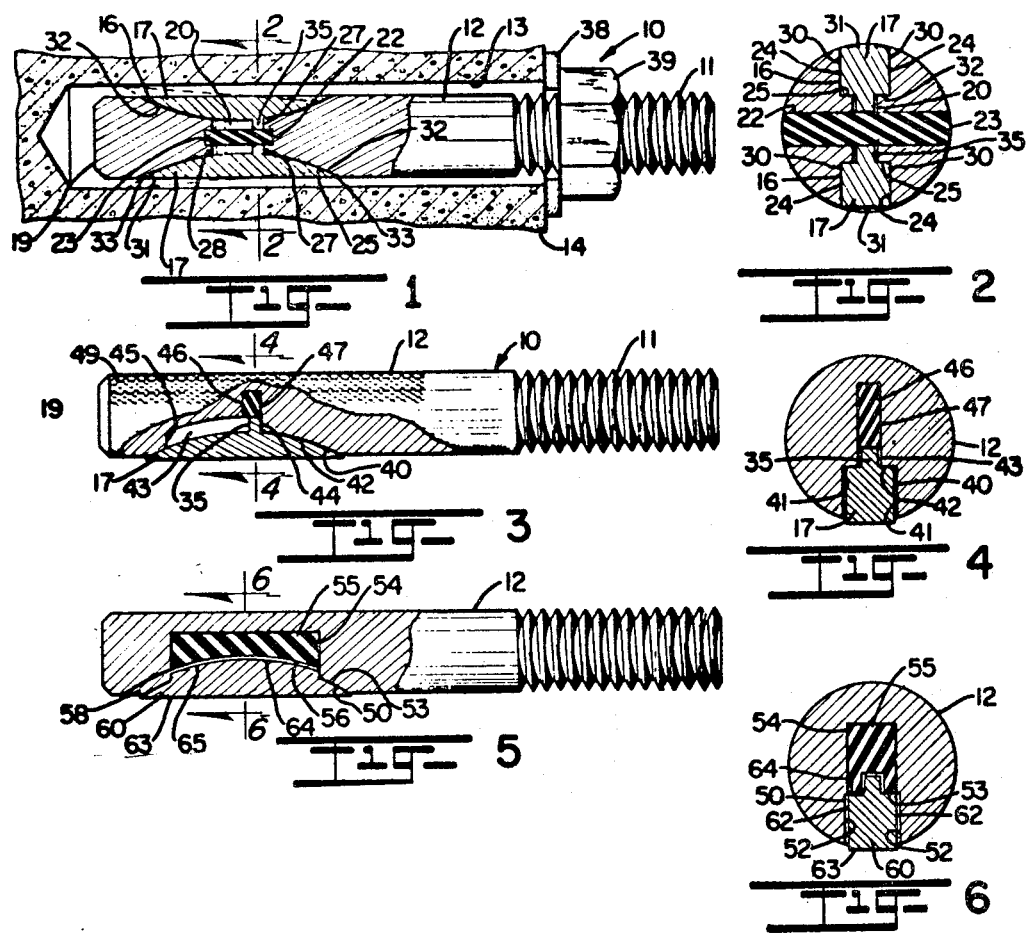

EXPANSION BOLT

This is a division of application Ser. No. 408,282, filed Nov. 2, 1964 now abandoned.

This invention relates to novel and improved fasteners, and more particularly relates to an expansion bolt characterized by having improved anchoring means which upon insertion into a bolt hole automatically will anchor the bolt against outward displacement from the hole in a reliable manner.

In the construction and design of anchor or expansion type bolts, it is highly desirable that the bolt assembly be made of a minimum number of parts arranged such that the bolt diameter will closely approximate, or be equal to, the size of the bolt hole; and upon insertion into the hole automatically will become set or anchored in place without necessity of manipulating the anchoring elements from either end of the bolt hole thus making it advantageously suited for use in blind holes. Further, that the bolt anchoring assembly including the actuating means therefor be wholly contained within the inserted portion of the bolt so as not to be exposed or otherwise subject to misalignment or accidental displacement upon insertion into the opening, while at the same time will not in any way interfere with insertion of the bolt through the opening. Accordingly it is a foremost object of the present invention to provide for a novel and improved expansion bolt which is so constructed and arranged that the actuating means for expanding the anchoring elements into anchored relation within a bolt hole provided in a wall structure or the like are located and contained within the inserted portion of the bolt assembly.

It is another object of the present invention to provide for an anchor bolt assembly which is so designed as to permit the bolt size to approximate the hole size and with the anchoring elements being so disposed thereon as not to interfere with insertion of the bolt into the hole; and furthermore wherein the anchoring elements are rapidly displaceable into wedging engagement under a minimum of outward displacement of the bolt from the hole.

It is a further object of the present invention to provide for a bolt assembly of the anchor or expansion type which is of simple and inexpensive construction and wherein each given bolt size is conformable for disposition in different sized openings within limits; and specifically, wherein the anchoring means are displaceable outwardly from a position in flush relation, or substantially so, to the outer peripheral surface of the inserted portion of the bolt to a position protruding laterally and outwardly into firm wedging engagement against the wall of the opening.

It is a still further object of the present invention to provide in an anchor bolt for a novel and improved actuating means in the form of an expansible insert wholly contained within the inserted portion of the bolt automatically to control outward circumferential expansion of one or more anchoring elements into wedging engagement within a bolt hole upon tightening or outward displacement of the bolt from the hole.

The above and other objects, advantages and features of the present invention will become more readily appreciated and understood from a consideration of the following detailed description of alternate forms of invention when taken together with the accompanying drawings in which:

FIG. 1 is a view, partially in section, of one form of expansion bolt in accordance with the present invention and illustrating in dotted form outward displacement of the anchoring elements into wedging engagement with the wall of an opening.

FIG. 2 is a section view taken on line 2—2 of FIG. 1.

FIG. 3 is a view, partially in section, of an alternate form of expansion bolt, in accordance with the present invention.

FIG. 4 is a sectional view taken on line 4—4 of FIG. 3.

FIG. 5 is a view of another alternate form of expansion bolt, similar to FIG. 3, incorporating a modified form of anchoring element and expansible insert.

FIG. 6 is a sectional view taken on line 6—6 of FIG. 5.

Referring in detail to the drawings, an anchor bolt assembly is illustrated in FIGS. 1 and 2 which is broadly comprised of a bolt member 10 having a threaded portion 11 and shank portion 12, the latter being insertable into an opening or bolt hole 13 which for the purpose of illustration may be formed in the wall 14 of a building structure or the like. As shown the shank 12 is generally circular in cross-section having a smooth outer peripheral surface in which is formed one or more external grooves 16 each for reception of an anchoring element 17. As here represented, a pair of grooves 16 are formed in diametrically opposed relation to one another adjacent to forward end 19 of the shank with a common guide opening or slot 20 extending between the grooves and intersecting a transverse slot 22 extending intermediately between the grooves 16 for reception of an expansible member in the form of a compressible insert 23.

In configuration, each groove is of generally concave shape being curved inwardly to form spaced parallel sidewalls 24 and an inner arcuate bearing surface 25 inclining or curving outwardly in opposite directions from an intermediate, relatively deep recessed area of the groove into relatively shallow recessed areas and terminating at the peripheral surface portion of the shank. In turn, the common slot 20 between the grooves in cross-section is preferably of elongated rectangular configuration being of reduced width in relation to the width of the groove to provide spaced sidewalls 26 and opposite end surfaces 27 and 28 which in a manner to be described limit the movement of the anchoring elements in relation to the groove. The transverse slot 22 also is of rectangular configuration, but is enlarged in relation to the size of the common slot 20, and is formed for disposition of the insert 23 in direct communication with the common slot.

The anchoring elements 17 are preferably in the form of arcuate wedges corresponding in size and shape to the grooves 16. Accordingly each wedge includes parallel sides 30, an outer flat surface 31, and an inner curved or arcuate cam surface 32 complementary to the bearing surface 25 and which intersects the outer surface 31 at opposite ends to form relatively sharp edges 33.

In order to control movement of each wedge 17 from a position lying substantially within the groove, as illustrated in full in FIG. 1, to an outwardly displaced position, as illustrated in dotted form, a guide member in the form of a generally rectangular pin 35 is directed inwardly from each inner cam surface 32 in offset relation to the center axis of the wedge for insertion into one end of the common slot 20. In this relation, each pin 35 normally is disposed along the end surface 27 of the common slot away from the forward end 19 and is of a length to be yieldingly engaged by the insert 23 and urged outwardly a sufficient distance for the outer wedge surface 31 to make contact with the wall of the opening.

The compressible insert 23 is preferably in the form of a generally rectangular block of resilient material, such as for example a rubber or rubberlike material, which is dimensioned to be slightly larger than the slot 22 so as to require forcing under compression into the slot. Accordingly, in assembled relation, the insert 23 will exert outward pressure tending to force each of the pins 35 and wedge elements 17 outwardly away from the surface of the shank; and upon insertion through the opening 13, any tendency of the wedges to become displaced into wedging engagement with the wall of the opening will be restricted by the pins 35 abutting the end surface 29 of the common slot so that the wedges will be constrained to remain in a position with the outer surfaces 31 substantially parallel to the longitudinal axis of the shank. Once inserted in place, however, the limit pins 35 are slidable forwardly through the slot 20 toward the forward end 19 of the shank to permit outward sliding movement of the wedges 17 along the groove bearing surfaces 25 to force the forward edges 33 into wedging engagement with the surrounding wall surface of the opening. In the form shown, this action may be initiated by a suitable washer 38 and an internally threaded nut 39 disposed on the threaded portion 11 of the bolt assembly and which upon tightening against the wall surface 14 will exert the necessary outward pressure on the bolt to cause outward displacement of the wedges 17 into anchored relation with the wall surface of the opening.

In assembly, and for the purpose of shipment, the wedges may be temporarily retained in assembled relation by a retainer band or ring, such as, a retainer ring of the type shown and described with reference to FIGS. 10 to 13 and which will easily expand or break when the wedges are expanded. For instance, under tightening pressure of the nut 39 and washer 38 against the wall surface 14, the retainer ring would be broken under the force of the wedges being displaced outwardly into wedging engagement.

In the form shown in FIGS. 3 and 4, like parts are correspondingly enumerated and again a bolt assembly may suitably consist of or include a bolt member 10 having a threaded portion 11 and shank portion 12. In this form, however, a single groove 40 is formed adjacent to the forward end of the shank for reception of a wedge element 17 of the type shown in FIGS. 1 and 2, and the groove having spaced parallel sidewalls 41 and an inner arcuate bearing surface 42. To permit wider latitude of movement of the single wedge 17 through the groove 40 than in the form shown in FIGS. 1 and 2, the off-center pin 35 rides in a forwardly curved guide slot 43 extending along the bearing surface from the deeper recessed portion of the groove to the forward relatively shallow portion. The curved guide slot is of reduced width in relation to the width of the groove and includes opposite end surfaces 44 and 45 to limit movement of the pin 35 so as to permit the wedge to advance in a forward direction only from its disposition within the groove as shown to an expanded position having its intermediate, relatively thick section disposed at the outer surface of the shank; or, in other words, will permit about one-half of the wedge to be laterally displaced from the groove angularly toward the wall of the opening.

A compressible insert 46 is positioned in a recess 47 directly behind the deeper recessed area of the groove 40 with one end of the slot forming an inward continuation of the end surface 44 of the guide slot. Again the insert 46 is composed of a resilient material and is enlarged in relation to the size of the recess so as to be inserted under compression within the recess prior to positioning of the wedge in place within the groove. Additionally, the outer peripheral surface of the shank opposite the groove may be knurled or otherwise roughened, as designated at 49, to cooperate with the wedge in establishing firm anchoring engagement with the wall of the opening.

In assembled relation, temporary retaining means may be placed over the wedge to hold it in place for insertion in the opening; and upon insertion the wedge is disposed along the groove with its outer surface parallel to the longitudinal axis of the shank. However, when outward pressure is exerted upon the shank tending to displace it from the opening, the limit pin 35 being free to slide forwardly through the guide slot, will permit the wedge to shift forwardly and outwardly along the arcuate bearing surface 42 into laterally displaced relation from the shank against the wall of the opening, as in the manner described in FIGS. 1 and 2; and further, will force the opposite knurled surface 50 into wedging engagement with the opposite side of the opening.

In the form of invention shown in FIGS. 5 and 6 the shank portion 12 has a groove 50 defining spaced parallel sides 52 and an arcuate cam surface 53; and a relatively broad, elongated rectangular slot 54 extends inwardly from an intermediate portion of the bearing surface transversely through a substantial thickness of the body for reception of an expansible insert 55. The insert 55 is of oblong, generally rectangular configuration and is enlarged somewhat in relation to that of the slot 54 so as to require forcing into snug-fitting relation within the slot. Moreover, the insert is formed with an outwardly facing arcuate or concave guide slot 56 which traverses the deeper intermediate portion of the groove, and a forward curved guide slot 58 of limited length is formed along the inner bearing surface at the forward end of the groove as a forward curved continuation of the arcuate slot 56.

A wedge element 60 is positioned in the groove 50 having spaced parallel sides 62, a relatively flat outer surface 63 and an inner arcuate cam surface 64 complementary to the arcuate bearing surface of the groove; however, in place of a guide pin of the type shown in FIGS. 1 to 4, the wedge is provided with a somewhat elongated curved guide member 65 for insertion in the arcuate guide slot 56. Accordingly, the wedge 60 may be aligned in the groove with one end of the guide member 65 abutting the end surface 54' of the slot 54; whereas the guide member is movable in a forward direction through the guide slots 56 and 58 to effect lateral displacement of the wedge.

The insert 55 is preferably composed of a resilient material to exert sufficient outward pressure against the inner surface of the wedge to force it into contact with the wall of the opening, and again the important requirement is that the wedge be maintained in aligned or centered relation along the groove so as not to interfere with insertion of the shank through the opening; then upon tightening or withdrawing the shank the wedge 60 will be free to slide forwardly through the groove for lateral displacement into firm wedging engagement with the wall of the opening or bolt hole.

From the foregoing, it will be seen from the various form of invention described that the anchoring elements will automatically displace themselves outwardly into firm wedging or anchoring relation with the wall of the opening when outward tension is exerted upon the bolt member. Thus, the actuating or expansion means for the anchoring elements primarily serve to predispose the anchoring elements in such relation to the shank as not to interfere with insertion of the bolt member through the opening so that upon outward displacement or tightening the anchoring elements will move immediately into anchoring relation with the wall. Moreover, since the entire assembly employed for anchoring is contained within the shank portion of the bolt, there is no need for special actuating members projecting along the shank through the threaded or exterior part of the bolt, thus affording greater latitude in choice of opening size and length for each given size of bolt. It is therefore to be understood from the foregoing description of various alternate forms of the present invention, that various changes and modifications may be made in the specific design, construction and arrangement of parts. For example, the thickness of the wedges in relation to the depth of the grooves in each form will be governed primarily by the extent of lateral displacement required of the wedges to establish contact and wedging engagement with the wall of the opening. Moreover, where two wedges are employed in combination as in the form shown in FIGS. 1 and 2 the degree of displacement of each wedge for a given size of opening would be much less than where a single wedge is utilized, as in the form shown in FIGS. 10 to 13, and accordingly the wedge size and distance of movement would be correspondingly less. In this relation, it will be further evident in FIGS. 10 to 13 that two or more wedges disposed in circumferentially spaced grooves may be provided in place of the single wedge and groove arrangements shown therein. Thus, any such changes and others may be resorted to without departing from the scope and spirit of the present invention as defined by the appended claims and any reasonable equivalents.

What is claimed is:

1. In an expansion bolt, a shank including at least one longitudinally extending external groove formed with an inner bearing surface inclining outwardly toward the forward end of said shank from a relatively deep portion to a relatively shallow portion of the groove, wedge member disposed in the groove including an outer wedging portion movable into wedging engagement with the wall of the opening provided for said bolt, said wedge member having a radially inwardly projecting guide member movable through a longitudinal guide slot communicating with the groove, said guide member and slot being so disposed in relation to said wedge member and groove respectively as to limit movement of said wedge in a forward direction only from its disposition in the relatively deep portion of the groove into wedging engagement with the wall of the opening, and an expansion member disposed in said shank and yieldingly engaging said guide member in a direction to yieldingly urge the outer wedging portion of said wedging member outwardly into contact with the wall of the opening so that upon withdrawal of said shank from the opening said wedge is automatically displaced outwardly into wedging engagement with the wall of the opening.

2. In an expansion bolt according to claim 1, the inner bearing surface for the groove being of arcuate configuration, and said wedge member having an inner cam surface complementary to the inner bearing surface.

3. In an expansion bolt according to claim 1, said expansion member disposed in a recess along the inner bearing surface of the groove to yieldingly engage said guide member.

4. In an expansion bolt according to claim 1, said guide member defined by a pin disposed in offset relation to said wedge member, said guide slot being disposed along the relatively deep portion of the groove.

5. In an expansion bolt according to claim 1, said expansion member having an outer surface portion defining the longitudinal guide slot and inner bearing surface along a portion of the groove, and said guide member being complementary to the shape of the outer surface of said expansion member.

6. In an expansion bolt, a shank including at least one longitudinally extending external groove formed with spaced side walls and an inner concave bearing surface curving outwardly in opposite directions from a relatively deep intermediate portion into relatively shallow portions at opposite ends of the groove, a wedge member substantially conforming in size and shape to that of the groove including an outer flat surface portion and an inner cam surface portion contacting the inner bearing surface in the groove, a guide member on said wedge member movable through a longitudinal guide slot in the groove for movement of said wedge member in a forward direction only through the groove, and an expansion member composed of a resilient material and being disposed inwardly of the groove to yieldingly engage said guide member in urging said wedge member outwardly into contact with the wall of the opening so that upon movement of said shank in a direction to withdraw it from the opening said wedge member is movable forwardly and outwardly into wedging engagement with the wall of the opening.

7. In an expansion bolt according to claim 6, the guide slot for said guide member extending forwardly and outwardly along the inner bearing surface of the groove, and said guide member projecting inwardly from the inner cam surface for movement in a forward direction through the guide slot with the cam surface sliding forwardly along the inner bearing surface for movement of said wedge member into wedging engagement.

8. In an expansion bolt according to claim 6, the groove being formed adjacent to the forward end of said shank, and said shank further having a roughened outer surface portion cooperating with said wedge to anchor said shank against withdrawal from the opening.

9. An expansion bolt comprising a shank provided with a pair of longitudinally extending external grooves disposed in diametrically opposed relation to one another, each groove including an inner bearing surface inclining outwardly toward the forward end of said shank from a relatively deep portion in the groove, a wedge member disposed in each of the grooves and each wedge including an inner cam surface movable in a forward direction only along the inner bearing surface of the groove for outward displacement of each wedge into wedging engagement with the wall of the opening provided for said bolt, a common expansion member disposed in a recess between the inner bearing surfaces of the grooves, a guide member extending radially and inwardly from each of said wedge members so as to be yieldingly engaged by said expansion member and to yieldingly urge said wedge members outwardly into contacting relation with the wall of the opening for continued movement into wedging engagement with the wall of the opening thereby to anchor said bolt against withdrawal from the opening.

10. An expansion bolt according to claim 9, wherein said expansion member is defined by a block of rubber-like material inserted under compression in the recess between the grooves.

* * * * *